(12) United States Patent
Chen

(10) Patent No.: US 10,750,369 B2
(45) Date of Patent: *Aug. 18, 2020

(54) METHOD, APPARATUS, AND PLATFORM FOR SHARING WIRELESS LOCAL AREA NETWORK

(71) Applicant: Huawei Technologies Co., Ltd., Shenzhen (CN)

(72) Inventor: Xi Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/380,524

(22) Filed: Apr. 10, 2019

(65) Prior Publication Data
US 2019/0239080 A1 Aug. 1, 2019

Related U.S. Application Data

(63) Continuation of application No. 15/399,922, filed on Jan. 6, 2017, now Pat. No. 10,292,050, which is a (Continued)

(51) Int. Cl.
*H04W 12/08* (2009.01)
*H04W 12/06* (2009.01)
(Continued)

(52) U.S. Cl.
CPC ......... *H04W 12/08* (2013.01); *H04W 12/003* (2019.01); *H04W 12/04* (2013.01);
(Continued)

(58) Field of Classification Search
CPC .... H04W 12/08; H04W 76/021; H04W 84/12
See application file for complete search history.

(56) References Cited

U.S. PATENT DOCUMENTS 8,275,131 B2 * 9/2012 Kim ................ H04W 12/08
380/51
8,285,992 B2 * 10/2012 Mathur ............ H04L 63/0236
713/171
(Continued)

FOREIGN PATENT DOCUMENTS

CN 101167328 A 4/2008
CN 101958914 A 1/2011
(Continued)

OTHER PUBLICATIONS

Foreign Communication From a Counterpart Application, European Application No. 14897388.6, European Office Action dated Mar. 6, 2019, 7 pages.
(Continued)

*Primary Examiner* — Mehmood B. Khan
(74) *Attorney, Agent, or Firm* — Conley Rose, P.C.

(57) ABSTRACT

A method, an apparatus, and a platform for sharing a wireless local area network, so as to resolve a problem of low system security that exists in a process of currently implementing wireless local area network sharing. In the embodiments of the present invention, a wireless local area network sharing platform receives a wireless local area network sharing message generated by a first terminal based on locally saved wireless local area network sharing information and generates, according to the sharing information, identifier information corresponding to a wireless local area network sharing page; a second terminal accesses a wireless local area network according to the identifier information.

20 Claims, 5 Drawing Sheets

Related U.S. Application Data continuation of application No. PCT/CN2014/081834, filed on Jul. 8, 2014.

(51) Int. Cl.
*H04W 12/00* (2009.01)
*H04W 76/11* (2018.01)
*H04W 12/04* (2009.01)
*H04W 84/12* (2009.01)

(52) U.S. Cl.
CPC ............ *H04W 12/06* (2013.01); *H04W 76/11* (2018.02); *H04W 12/00503* (2019.01); *H04W 84/12* (2013.01)

(56) References Cited

U.S. PATENT DOCUMENTS

| | | | |
|---|---|---|---|
| 8,316,438 B1* | 11/2012 | Bush ..................... | H04L 12/66 726/22 |
| 8,774,210 B2* | 7/2014 | Grohman ............... | H04L 12/413 370/448 |
| 2006/0190991 A1* | 8/2006 | Iyer ....................... | H04L 63/083 726/3 |
| 2008/0049779 A1* | 2/2008 | Hopmann ............ | H04L 12/2807 370/431 |
| 2009/0070859 A1 | 3/2009 | Mathur et al. | |
| 2009/0198808 A1* | 8/2009 | Cai ........................ | H04L 12/14 709/223 |
| 2010/0019888 A1 | 1/2010 | Cho et al. | |
| 2011/0277024 A1* | 11/2011 | Begley .................. | H04L 67/34 726/7 |
| 2012/0030194 A1* | 2/2012 | Jain ....................... | G06F 3/0481 707/722 |
| 2012/0276075 A1 | 11/2012 | Monod et al. | |
| 2013/0151638 A1* | 6/2013 | Chen ..................... | H04L 51/04 709/206 |
| 2013/0268277 A1 | 10/2013 | Duplan | |
| 2014/0033288 A1* | 1/2014 | Wynn ................... | H04W 12/08 726/7 |
| 2014/0068719 A1* | 3/2014 | Kiukkonen ........... | H04W 12/08 726/4 |
| 2014/0089662 A1* | 3/2014 | Huang ................... | G06F 16/178 713/165 |
| 2014/0215210 A1* | 7/2014 | Wang .................... | G06F 21/6209 713/165 |
| 2014/0282951 A1* | 9/2014 | Ranade ................. | H04L 63/062 726/6 |
| 2014/0289825 A1* | 9/2014 | Chan ..................... | H04W 12/06 726/5 |
| 2016/0057161 A1 | 2/2016 | Li et al. | |
| 2016/0274881 A1* | 9/2016 | Wang .................... | H04L 67/06 |

FOREIGN PATENT DOCUMENTS

| | | |
|---|---|---|
| CN | 102724668 A | 10/2012 |
| CN | 103095852 A | 5/2013 |
| CN | 103164524 A | 6/2013 |
| CN | 103179640 A | 6/2013 |
| CN | 103298072 A | 9/2013 |
| CN | 103765981 A | 4/2014 |
| KR | 1020150104667 A | 9/2015 |

OTHER PUBLICATIONS

Machine Translation and Abstract of Chinese Publication No. CN103095852, May 8, 2013, 7 pages.
Machine Translation and Abstract of Chinese Publication No. CN103765981, Apr. 30, 2014, 12 pages.
Machine Translation and Abstract of Chinese Publication No. CN101958914, Jan. 26, 2011, 12 pages.
Machine Translation and Abstract of Chinese Publication No. CN102724668, Oct. 10, 2012, 11 pages.
Machine Translation and Abstract of Chinese Publication No. CN103164524, Jun. 19, 2013, 4 pages.
Machine Translation and Abstract of Chinese Publication No. CN103298072, Sep. 11, 2013, 10 pages.
Foreign Communication From a Counterpart Application, European Application No. 14897388.6, European Office Action dated Oct. 26, 2018, 6 pages.
Foreign Communication From a Counterpart Application, Chinese Application No. 201480051374.4, Chinese Office Action dated May 4, 2018, 10 pages.
Foreign Communication From a Counterpart Application, European Application No. 14897388.6, Extended European Search Report dated May 4, 2017, 7 pages.
Foreign Communication From a Counterpart Application, PCT Application No. PCT/CN2014/081834, English Translation of International Search Report dated Mar. 27, 2015, 2 pages.
Foreign Communication From a Counterpart Application, PCT Application No. PCT/CN2014/081834, English Translation of Written Opinion dated Mar. 27, 2015, 8 pages.
Office Action dated Jul. 14, 2017, U.S. Appl. No. 15/399,922, filed Jan. 6, 2017, 9 pages.
Office Action dated Jan. 24, 2018, U.S. Appl. No. 15/399,922, filed Jan. 6, 2017, 16 pages.
Office Action dated Jul. 3, 2018, U.S. Appl. No. 15/399,922, filed Jan. 6, 2017, 14 pages.
Notice of Allowance dated Jan. 9, 2019, U.S. Appl. No. 15/399,922, filed Jan. 6, 2017, 11 pages.

* cited by examiner

_US 10,750,369 B2_

METHOD, APPARATUS, AND PLATFORM FOR SHARING WIRELESS LOCAL AREA NETWORK

CROSS-REFERENCE TO RELATED APPLICATIONS

This application is a continuation of U.S. patent application Ser. No. 15/399,922, filed on Jan. 6, 2017, which is a continuation of International Application No. PCT/CN2014/081834, filed on Jul. 8, 2014. All of the aforementioned patent applications are hereby incorporated by reference in their entireties.

TECHNICAL FIELD

The present disclosure relates to the field of communications technologies, and in particular, to a method, an apparatus, and a platform for sharing a wireless local area network.

BACKGROUND

With rapid development of mobile terminals such as a smartphone and a tablet computer, implementing a data service by using a wireless network has become an important information transmission manner. In the wireless network, a wireless local area network (WLAN) is a network that works at an unlicensed frequency band of 2.4 GHz/5.8 GHz. The wireless local area network bears increasing wireless data traffic because of its advantages such as high mobility, a low cost, and a high construction speed.

Currently, each terminal to which the WLAN is applied can share bandwidth to access an access point (AP). To ensure security of each terminal that accesses the WLAN and ensure that bandwidth of the WLAN is not occupied by an unauthorized user, a corresponding password generally needs to be set on the AP in the WLAN. When accessing the WLAN by using the terminal, a user enters the foregoing password on the terminal, so as to ensure that AP authentication succeeds.

As can be seen, currently, when WLAN sharing is performed, each user that requests to share the WLAN needs to be notified of a WLAN service set identifier (SSID) and a WLAN password; each user that requests to share the WLAN enters the foregoing WLAN SSID and WLAN password on the terminal, and after the AP authentication succeeds, the terminal may access the WLAN. For example, for Wi-Fi that is commonly applied at home or in an office place, the user needs to learn an SSID of a wireless router corresponding to the Wi-Fi. After searching for and finding the WLAN SSID of the wireless router, the terminal may be connected to the wireless router; after a password of the wireless router is entered on the terminal, the terminal can be connected to wireless router, and then connected to the network by using the wireless router. In the foregoing technical solution, all users that share the WLAN need to learn the WLAN SSID and the WLAN password, which causes a problem of low security during the WLAN sharing.

In conclusion, a problem of low system security exists in a process of currently implementing WLAN sharing.

SUMMARY

Embodiments of the present invention provide a method, an apparatus, and a platform for sharing a wireless local area network, so as to resolve a problem of low system security that exists in a process of currently implementing wireless local area network sharing.

Specific technical solutions provided in the embodiments of the present invention are as follows:

According to a first aspect, a method for sharing a wireless local area network is provided, including: receiving a wireless local area network sharing message sent by a first terminal, where the wireless local area network sharing message carries wireless local area network sharing information; generating a wireless local area network sharing page according to the wireless local area network sharing information carried in the wireless local area network sharing message, where the wireless local area network sharing page includes the wireless local area network sharing information; generating identifier information corresponding to the wireless local area network sharing page, where the identifier information is used to identify the wireless local area network sharing page; and notifying the identifier information corresponding to the wireless local area network sharing page to a second terminal that requests to share the wireless local area network, so that the second terminal accesses the wireless local area network sharing page according to the identifier information and accesses the wireless local area network according to the wireless local area network sharing information included in the wireless local area network sharing page.

With reference to the first aspect, in a first possible implementation manner, obtaining a uniform resource locator corresponding to the wireless local area network sharing page; and using encoded information obtained by encoding the uniform resource locator as the identifier information corresponding to the wireless local area network sharing page.

With reference to the first aspect or the first possible implementation manner of the first aspect, in a second possible implementation manner, the wireless local area network sharing information includes a wireless local area network service set identifier, and a user name and a password for accessing the wireless local area network.

With reference to the second possible implementation manner of the first aspect, in a third possible implementation manner, the wireless local area network sharing information further includes wireless local area network sharing validity information; and after the wireless local area network sharing page is generated, the method further includes: when receiving a wireless local area network sharing invalidity setting message sent by the first terminal, setting the wireless local area network sharing validity information included in the wireless local area network sharing page to invalid wireless local area network sharing.

With reference to the third possible implementation manner of the first aspect, in a fourth possible implementation manner, the method further includes: when it is detected that the second terminal accesses the wireless local area network sharing page according to the identifier information, obtaining the wireless local area network sharing validity information included in the wireless local area network sharing page; and when determining that the obtained wireless local area network sharing validity information is valid wireless local area network sharing, returning the wireless local area network sharing page to the second terminal.

According to a second aspect, an apparatus for sharing a wireless local area network is provided, including: a receiving unit, configured to receive a wireless local area network sharing message sent by a first terminal, and send the wireless local area network sharing message to a sharing page generation unit, where the wireless local area network sharing message carries wireless local area network sharing information; the sharing page generation unit, configured to receive the wireless local area network sharing message sent by the receiving unit, generate a wireless local area network sharing page according to the wireless local area network sharing information carried in the wireless local area network sharing message, and send the wireless local area network sharing page to an identifier information generation unit, where the wireless local area network sharing page includes the wireless local area network sharing information; the identifier information generation unit, configured to receive the wireless local area network sharing page generated by the sharing page generation unit, generate identifier information corresponding to the wireless local area network sharing page, and send the identifier information corresponding to the wireless local area network sharing page to a notification unit, where the identifier information is used to uniquely identify the wireless local area network sharing page; and the notification unit, configured to receive the identifier information that is corresponding to the wireless local area network sharing page and that is generated by the identifier information generation unit and notify the identifier information corresponding to the wireless local area network sharing page to a second terminal that requests to share the wireless local area network, so that the second terminal accesses the wireless local area network sharing page according to the identifier information and accesses the wireless local area network according to the wireless local area network sharing information included in the wireless local area network sharing page.

With reference to the second aspect, in a first possible implementation manner, the identifier information generation unit is specifically configured to: obtain a uniform resource locator corresponding to the wireless local area network sharing page; and use encoded information obtained by encoding the uniform resource locator as the identifier information corresponding to the wireless local area network sharing page.

With reference to the second aspect or the first possible implementation manner of the second aspect, in a second possible implementation manner, the sharing page generation unit is specifically configured to generate the wireless local area network sharing page according to a wireless local area network service set identifier, and a user name and a password for accessing the wireless local area network, where the wireless local area network service set identifier, and the user name and the password for accessing the wireless local area network are included in the wireless local area network sharing information.

With reference to the second possible implementation manner of the second aspect, in a third possible implementation manner, the apparatus further includes a setting unit, configured to: if the wireless local area network sharing information includes wireless local area network sharing validity information, after the wireless local area network sharing page is generated, when receiving a wireless local area network sharing invalidity setting message sent by the first terminal, set the wireless local area network sharing validity information included in the wireless local area network sharing page to invalid wireless local area network sharing.

With reference to the third possible implementation manner of the second aspect, in a fourth possible implementation manner, the apparatus further includes an authentication unit, configured to: when it is detected that the second terminal accesses the wireless local area network sharing page according to the identifier information, obtain the wireless local area network sharing validity information included in the wireless local area network sharing page; and when determining that the obtained wireless local area network sharing validity information is valid wireless local area network sharing, return the wireless local area network sharing page to the second terminal.

According to a third aspect, a wireless local area network sharing platform is provided, including: a transceiver, configured to receive a wireless local area network sharing message sent by a first terminal, and send the wireless local area network sharing message to a processor; and the processor, configured to receive the wireless local area network sharing message sent by the transceiver and generate a wireless local area network sharing page according to wireless local area network sharing information carried in the wireless local area network sharing message, where the wireless local area network sharing page includes the wireless local area network sharing information; where: the processor is further configured to generate identifier information corresponding to the wireless local area network sharing page and send the identifier information corresponding to the wireless local area network sharing page to the transceiver, where the identifier information is used to uniquely identify the wireless local area network sharing page; and the transceiver is further configured to notify, to a second terminal that requests to share the wireless local area network, the identifier information that is corresponding to the wireless local area network sharing page and that is sent by the processor, so that the second terminal accesses the wireless local area network sharing page according to the identifier information and accesses the wireless local area network according to the wireless local area network sharing information included in the wireless local area network sharing page.

With reference to the third aspect, in a first possible implementation manner, the processor is configured to: obtain a uniform resource locator corresponding to the wireless local area network sharing page; and use encoded information obtained by encoding the uniform resource locator as the identifier information corresponding to the wireless local area network sharing page.

With reference to the third aspect, in a second possible implementation manner, the processor is configured to generate the wireless local area network sharing page according to a wireless local area network service set identifier, and a user name and a password for accessing the wireless local area network, where the wireless local area network service set identifier, and the user name and the password for accessing the wireless local area network are included in the wireless local area network sharing information.

With reference to the second possible implementation manner of the third aspect, in a third possible implementation manner, the processor is further configured to generate the wireless local area network sharing page according to wireless local area network sharing validity information included in the wireless local area network sharing information.

With reference to the third possible implementation manner of the third aspect, in a fourth possible implementation manner, the transceiver is further configured to receive a wireless local area network sharing invalidity setting message sent by the first terminal, and send the wireless local area network sharing invalidity setting message to the processor.

With reference to the fourth possible implementation manner of the third aspect, in a 5 possible implementation manner, the processor is further configured to: after the wireless local area network sharing page is generated, when receiving the wireless local area network sharing invalidity setting message sent by the transceiver, set, according to the wireless local area network sharing invalidity setting message, the wireless local area network sharing validity information included in the wireless local area network sharing page to invalid wireless local area network sharing.

With reference to the 5 possible implementation manner of the third aspect, in a 6 possible implementation manner, the transceiver is further configured to receive a message that the second terminal requests to access the wireless local area network sharing page according to the identifier information and send the message of requesting to access the wireless local area network sharing page to the processor.

With reference to the 6 possible implementation manner of the third aspect, in a 7 possible implementation manner, the processor is further configured to: receive the message that is used to request to access the wireless local area network sharing page and that is sent by the transceiver; when determining, according to the message of requesting to access the wireless local area network sharing page, that the second terminal accesses the wireless local area network sharing page, obtain the wireless local area network sharing validity information included in the wireless local area network sharing page; and when determining that the obtained wireless local area network sharing validity information is valid wireless local area network sharing, instruct the transceiver to return the wireless local area network sharing page to the second terminal.

In the embodiments of the present invention, a wireless local area network sharing platform receives a wireless local area network sharing message generated by a first terminal based on locally saved wireless local area network sharing information and generates, according to the sharing information, identifier information corresponding to a wireless local area network sharing page; a second terminal accesses a wireless local area network according to the identifier information. In the technical solutions of the present invention, the second terminal may access the wireless local area network only according to the sharing information included in the wireless local area network sharing page, and a user does not need to learn relevant information such as a user name of the wireless local area network and a password of the wireless local area network, which avoids leakage of the user's information and improves system security.

DESCRIPTION OF EMBODIMENTS

To resolve a problem of low system security that exists in a process of currently sharing a wireless local area network, in the embodiments of the present invention, a wireless local area network sharing platform receives a wireless local area network sharing message generated by a first terminal based on locally saved wireless local area network sharing information and generates, according to the sharing information, identifier information corresponding to a wireless local area network sharing page; a second terminal accesses the wireless local area network according to the identifier information. In the technical solutions of the present invention, the second terminal may access the wireless local area network only according to the sharing information included in the wireless local area network sharing page, and a user does not need to learn relevant information such as a user name of the wireless local area network and a password of the wireless local area network, which avoids leakage of the user's information and improves the system security.

To make the objectives, technical solutions, and advantages of the embodiments of the present invention clearer, the following clearly and completely describes the technical solutions in the embodiments of the present invention with reference to the accompanying drawings in the embodiments of the present invention. The described embodiments are some but not all of the embodiments of the present invention. All other embodiments obtained by a person of ordinary skill in the art based on the embodiments of the present invention without creative efforts shall fall within the protection scope of the present invention.

Figure 1:
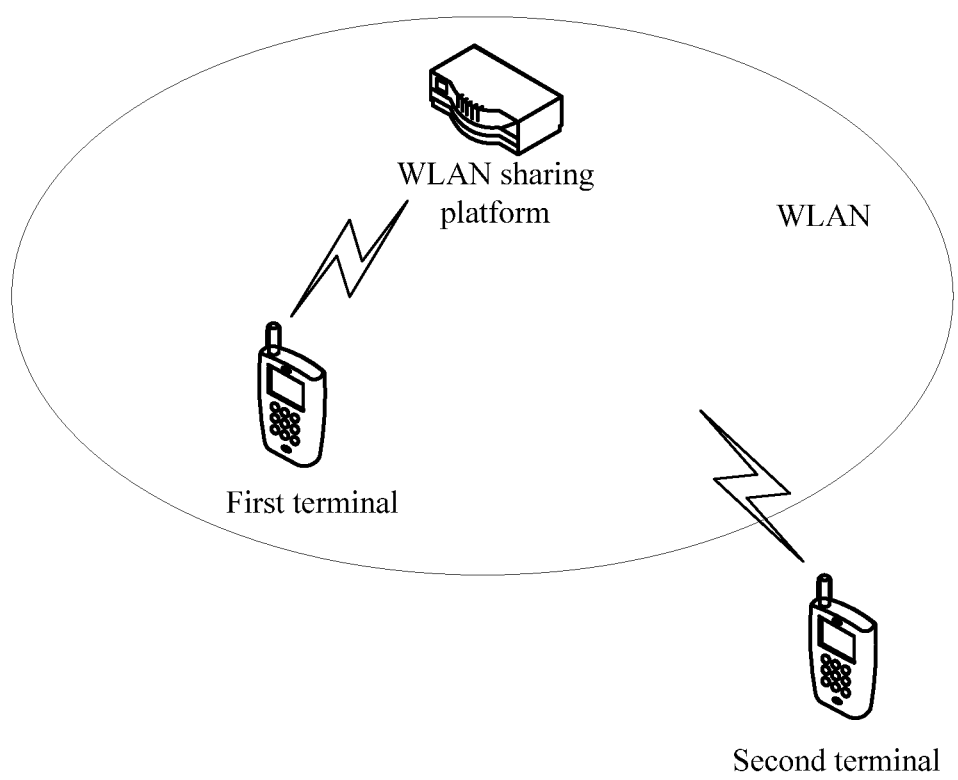
FIG. 1 is a schematic diagram of an architecture of a wireless local area network system according to an embodiment of the present invention.

Referring to FIG. 1, FIG. 1 is a schematic diagram of an architecture of a wireless local area network system according to an embodiment of the present invention. The wireless local area network (WLAN) system includes a wireless local area network sharing platform, a first terminal, and a second terminal. The first terminal is a terminal that has already accessed the foregoing wireless local area network. The second terminal is a terminal that requests to share the wireless local area network. The wireless local area network sharing platform may be a server located in a cloud or may be a wireless local area network sharing apparatus located at an access point (AP).

Specifically, the first terminal is configured to generate a wireless local area network sharing message according to locally saved wireless local area network sharing information and send the wireless local area network sharing message to the wireless local area network sharing platform.

The wireless local area network sharing platform is configured to: generate a wireless local area network sharing page according to the wireless local area network sharing information carried in the wireless local area network sharing message sent by the first terminal; generate, according to the wireless local area network sharing page, identifier information corresponding to the foregoing wireless local area network sharing page; and notify the second terminal that requests to share the foregoing wireless local area network of the identifier information corresponding to the foregoing wireless local area network sharing page.

The second terminal is configured to access the wireless local area network sharing page according to the identifier information corresponding to the foregoing wireless local area network sharing page and access the foregoing wireless local area network according to the wireless local area network sharing information included in the wireless local area network sharing page.

Figure 2:
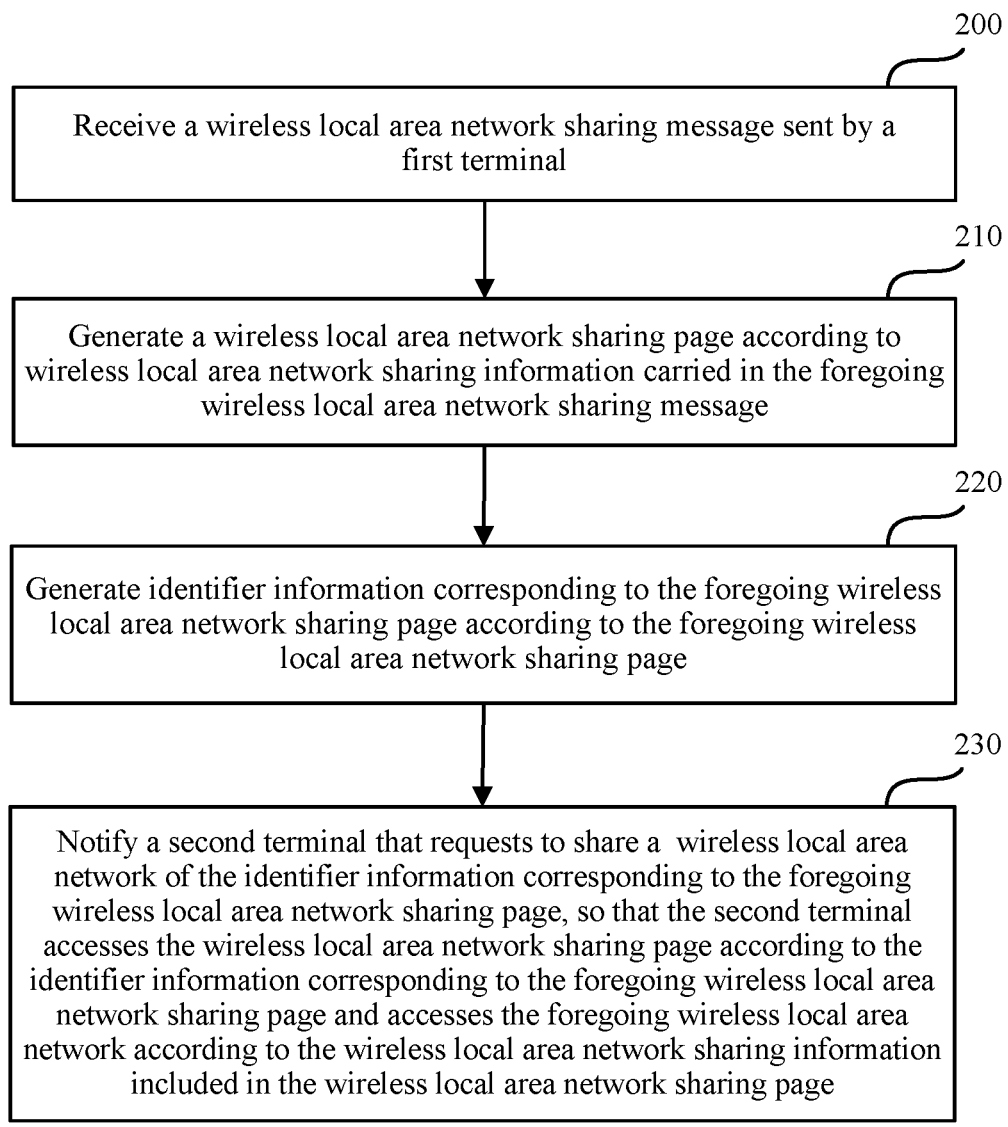
FIG. 2 is a first flowchart of a method for sharing a wireless local area network according to an embodiment of the present invention.

Referring to FIG. 2, FIG. 2 is a first flowchart of a method for sharing a wireless local area network according to an embodiment of the present invention. A process of a method for a second terminal to share the wireless local area network by using a wireless local area network sharing platform in this embodiment of the present invention is as follows:

Step 200: Receive a wireless local area network sharing message sent by a first terminal.

In this embodiment of the present invention, the first terminal generates the wireless local area network sharing message according to locally saved wireless local area network sharing information and sends the wireless local area network sharing message to the wireless local area network sharing platform. The first terminal is a terminal that accesses the wireless local area network. The foregoing wireless local area network sharing information includes a wireless local area network SSID, a user name, and a wireless local area network password. For example, when shared wireless local area network is a home wireless local area network controlled by a wireless router, the wireless local area network sharing information includes at least the wireless local area network SSID (that is, a name corresponding to the wireless router) and the wireless local area network password. When the shared wireless local area network is a wireless local area network such as that provided by the Chinese Mobile Communications Corporation (CMCC), the wireless local area network sharing information includes at least the wireless local area network SSID, the user name obtained by a user from an operator, and the wireless local area network password.

Optionally, the foregoing wireless local area network sharing information further includes a wireless local area network encryption manner, wireless local area network sharing validity information, and the like. The wireless local area network sharing validity information is information that indicates whether the wireless local area network sharing is valid and may include information such as a wireless local area network sharing validity period.

Step 210: Generate a wireless local area network sharing page according to wireless local area network sharing information carried in the foregoing wireless local area network sharing message.

In this embodiment of the present invention, the wireless local area network sharing platform generates, according to the wireless local area network sharing information carried in the wireless local area network sharing message, the wireless local area network sharing page corresponding to the wireless local area network sharing information. The wireless local area network sharing page includes web interface options and wireless local area network sharing information corresponding to each web interface option. Optionally, after generating the foregoing wireless local area network sharing page, the first terminal may access the wireless local area network sharing page by logging in to the wireless local area network sharing platform and set the foregoing web interface options.

Step 220: Generate, according to the foregoing wireless local area network sharing page, identifier information corresponding to the foregoing wireless local area network sharing page.

In this embodiment of the present invention, after the wireless local area network sharing page corresponding to the wireless local area network sharing information is generated, the wireless local area network sharing platform obtains a uniform resource locator (URL) corresponding to the wireless local area network sharing page; encodes, according to the URL corresponding to the wireless local area network sharing page, the URL corresponding to the foregoing wireless local area network sharing page by using an encoding technology, and uses encoded information obtained by means of encoding as the identifier information corresponding to the foregoing wireless local area network sharing page. The identifier information corresponding to the foregoing wireless local area network sharing page is information that uniquely identifies the foregoing wireless local area network sharing page. The identifier information includes the foregoing URL, that is, the second terminal may obtain the URL by reading the identifier information, log in to the wireless local area network sharing platform according to the URL, and access the wireless local area network sharing page.

Optionally, the identifier information corresponding to the foregoing wireless local area network sharing page may be quick response code information, sound wave information, barcode information, near field communication technology (NFC) information, or infrared radiation (IR) information.

Step 230: Notify a second terminal that requests to share the foregoing wireless local area network of the identifier information corresponding to the foregoing wireless local area network sharing page, so that the second terminal accesses the wireless local area network sharing page according to the identifier information corresponding to the foregoing wireless local area network sharing page and accesses the foregoing wireless local area network according to the wireless local area network sharing information included in the wireless local area network sharing page.

In this embodiment of the present invention, the wireless local area network sharing platform sends the identifier information corresponding to the foregoing wireless local area network sharing page to the first terminal. The second terminal that requests to share the foregoing wireless local area network obtains, from the first terminal, the identifier information corresponding to the foregoing wireless local area network sharing page. A manner in which the second terminal obtains, from the first terminal, the identifier information corresponding to the foregoing wireless local area network sharing page varies with a form of the identifier information. The second terminal may obtain the identifier information in a manner of sending the identifier information to the second terminal by the first terminal, or the second terminal may obtain the identifier information in a manner of reading the identifier information from the first terminal by the second terminal. For example, when the wireless local area network sharing platform sends the identifier information corresponding to the foregoing wireless local area network sharing page to the first terminal and the identifier information is the quick response information, the first terminal saves the quick response information corresponding to the foregoing wireless local area network sharing page. If requesting to share the foregoing wireless local area network, the second terminal reads the identifier information corresponding to the foregoing wireless local area network sharing page in a manner of scanning the quick response information that is corresponding to the foregoing wireless local area network sharing page and that is saved by the first terminal. When the identifier information is the sound wave information, the first terminal saves the sound wave information corresponding to the foregoing wireless local area network sharing page. If requesting to share the foregoing wireless local area network, the second terminal reads the identifier information corresponding to the foregoing wireless local area network sharing page in a manner of identifying the sound wave information played at the first terminal.

Optionally, when receiving a wireless local area network sharing invalidity indication entered by a user, the first terminal may generate a wireless local area network sharing invalidity setting message according to the wireless local area network sharing invalidity indication, and send the wireless local area network sharing invalidity setting message to the wireless local area network sharing platform. The wireless local area network sharing platform sets, according to a wireless local area network SSID and a user name that are carried in the wireless local area network sharing invalidity setting message, the wireless local area network sharing validity information corresponding to the first terminal to invalid wireless local area network sharing; or the user logs in to the wireless local area network sharing platform by using the first terminal, accesses the foregoing wireless local area network sharing page, and sets, on the wireless local area network sharing page, the wireless local area network sharing validity information corresponding to the first terminal to invalid wireless local area network sharing.

Further, in the foregoing process, the second terminal sends a wireless local area network sharing page access request to the wireless local area network sharing platform by using the identifier information. In this case, the wireless local area network sharing platform needs to detect, according to the wireless local area network sharing validity information included in the wireless local area network sharing page, whether corresponding wireless local area network sharing is valid. When determining that the wireless local area network sharing validity information included in the wireless local area network sharing page is valid wireless local area network sharing, the wireless local area network sharing platform returns the wireless local area network sharing page to the second terminal, and the second terminal presents the wireless local area network sharing page on a local interface. On the wireless local area network sharing page, the wireless local area network sharing information is in encrypted state. When determining that the wireless local area network sharing validity information included in the wireless local area network sharing page is invalid wireless local area network sharing, the wireless local area network sharing platform sends a wireless local area network sharing failure message to the second terminal. The wireless local area network sharing platform performs encryption on the wireless local area network sharing information in the wireless local area network sharing page by using a data encryption standard (DES) algorithm, an international data encryption algorithm (IDEA), an advanced encryption standard (AES) algorithm, or the like.

Optionally, when the wireless local area network sharing validity information included in the foregoing wireless local area network sharing page is valid wireless local area network sharing, after obtaining the wireless local area network sharing page and parsing, by using a preset decryption algorithm, the encrypted wireless local area network sharing information on the wireless local area network sharing page, the second terminal obtains the wireless local area network sharing information included in the wireless local area network sharing page and accesses, by using the wireless local area network sharing information, the wireless local area network corresponding to the first terminal.

Figure 3:
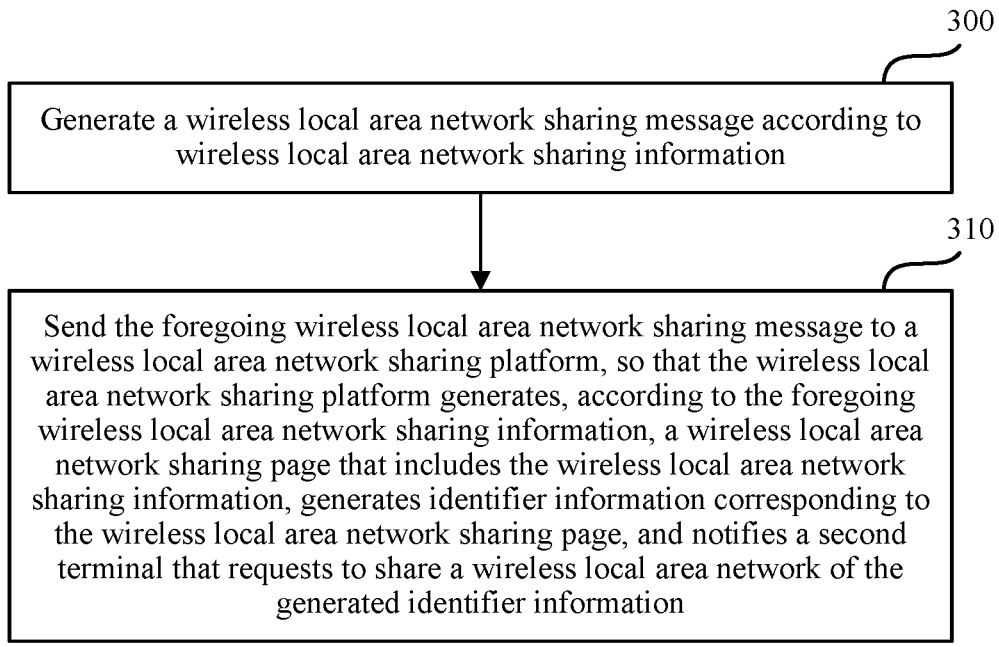
FIG. 3 is a second flowchart of a method for sharing a wireless local area network according to an embodiment of the present invention.

Referring to FIG. 3, FIG. 3 is a second flowchart of a method for sharing a wireless local area network according to an embodiment of the present invention. A process of a method for a second terminal to share the wireless local area network by using a first terminal in this embodiment of the present invention is as follows:

Step 300: Generate a wireless local area network sharing message according to wireless local area network sharing information.

In this embodiment of the present invention, the first terminal generates the wireless local area network sharing message according to the locally saved wireless local area network sharing information. The first terminal is a terminal that accesses the wireless local area network. The foregoing wireless local area network sharing information includes a wireless local area network SSID, a user name, and a wireless local area network password; optionally, the foregoing wireless local area network sharing information further includes a wireless local area network encryption manner, wireless local area network sharing validity information, and the like.

Step 310: Send the foregoing wireless local area network sharing message to a wireless local area network sharing platform, so that the wireless local area network sharing platform generates, according to the foregoing wireless local area network sharing information, a wireless local area network sharing page that includes the wireless local area network sharing information, generates identifier information corresponding to the wireless local area network sharing page, and notifies a second terminal that requests to share a wireless local area network of the generated identifier information.

In this embodiment of the present invention, the first terminal receives the identifier information that is corresponding to the wireless local area network sharing page and that is generated by the foregoing wireless local area network sharing platform based on the wireless local area network sharing information, and sends the identifier information to the second terminal that requests to share the wireless local area network. The second terminal accesses, according to the foregoing identifier information, the wireless local area network sharing page corresponding to the identifier information, and accesses the wireless local area network according to the wireless local area network sharing information included in the wireless local area network sharing page.

Optionally, when receiving a wireless local area network sharing invalidity indication entered by a user, the first terminal may generate a wireless local area network sharing invalidity setting message according to the wireless local area network sharing invalidity indication, and send the wireless local area network sharing invalidity setting message to the wireless local area network sharing platform. The wireless local area network sharing platform sets, according to a wireless local area network SSID and a user name that are carried in the wireless local area network sharing invalidity setting message, the wireless local area network sharing validity information included in the wireless local area network sharing page corresponding to the first terminal to invalid wireless local area network sharing; or the user logs in to the wireless local area network sharing platform by using the first terminal, accesses the foregoing wireless local area network sharing page, and sets, on the wireless local area network sharing page, the wireless local area network sharing validity information corresponding to the first terminal to invalid wireless local area network sharing.

Figure 4:
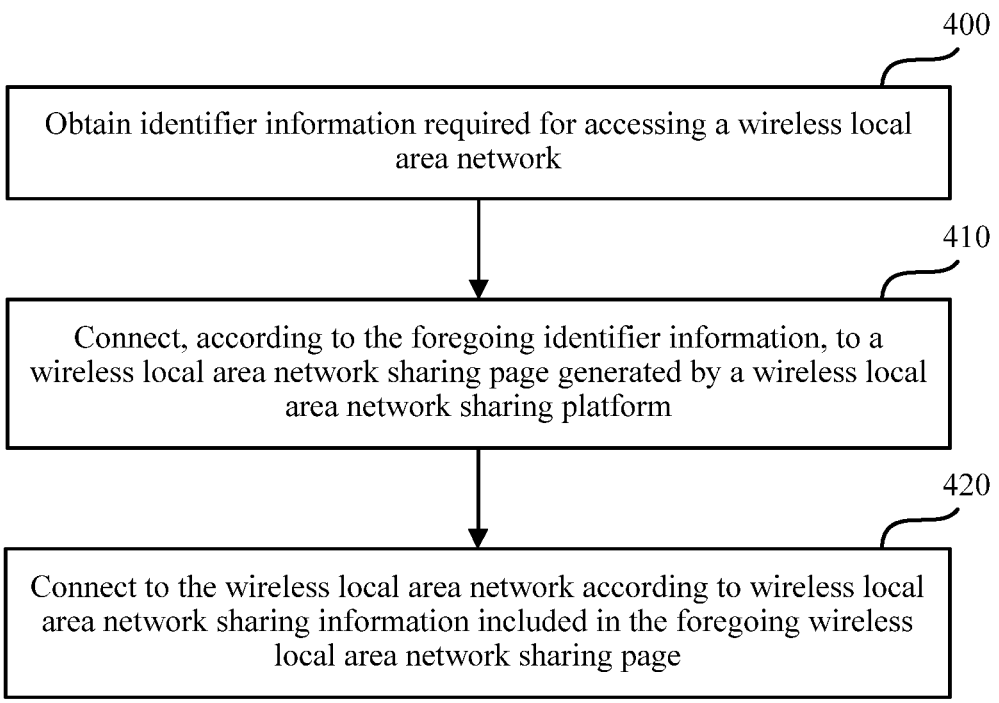
FIG. 4 is a third flowchart of a method for sharing a wireless local area network according to an embodiment of the present invention.

Referring to FIG. 4, FIG. 4 is a third flowchart of a method for sharing a local area network according to an embodiment of the present invention. A process of a method for a second terminal to share the wireless local area network in this embodiment of the present invention is as follows:

Step 400: Obtain identifier information required for accessing a wireless local area network.

In this embodiment of the present invention, the second terminal obtains the identifier information that is locally saved by a first terminal that has already accessed the foregoing wireless local area network. The identifier information is used to uniquely identify a wireless local area network sharing page.

Step 410: Connect, according to the foregoing identifier information, to a wireless local area network sharing page generated by a wireless local area network sharing platform.

In this embodiment of the present invention, the second terminal logs in to the wireless local area network sharing platform according to the foregoing identifier information. When the wireless local area network sharing platform detects that the wireless local area network sharing is valid, the second terminal accesses the wireless local area network sharing page corresponding to the identifier information.

Step 420: Connect to the wireless local area network according to wireless local area network sharing information included in the foregoing wireless local area network sharing page.

In this embodiment of the present invention, after accessing the wireless local area network sharing page by running a local browser application program, the second terminal obtains the encrypted wireless local area network sharing information included in the wireless local area network sharing page. The second terminal parses the encrypted wireless local area network sharing information in a wireless local area network encryption manner and that is connected to the wireless local area network by running a web app included in the browser according to the parsed wireless local area network sharing information. The wireless local area network encryption manner is delivered by the wireless local area network sharing platform. An application program included in the web app is the same as a configuration program that controls a wireless network connection module in the second terminal.

In the foregoing technical solutions, a second terminal obtains encrypted wireless local area network sharing information by accessing a wireless local area network sharing page and accesses a wireless local area network according to the encrypted wireless local area network sharing information. It is implemented that the second terminal shares the wireless local area network corresponding to a first terminal, and the user does not need to enter relevant information of the wireless local area network at the second terminal, which avoids a problem of information leakage and effectively improves system security.

Figure 5:
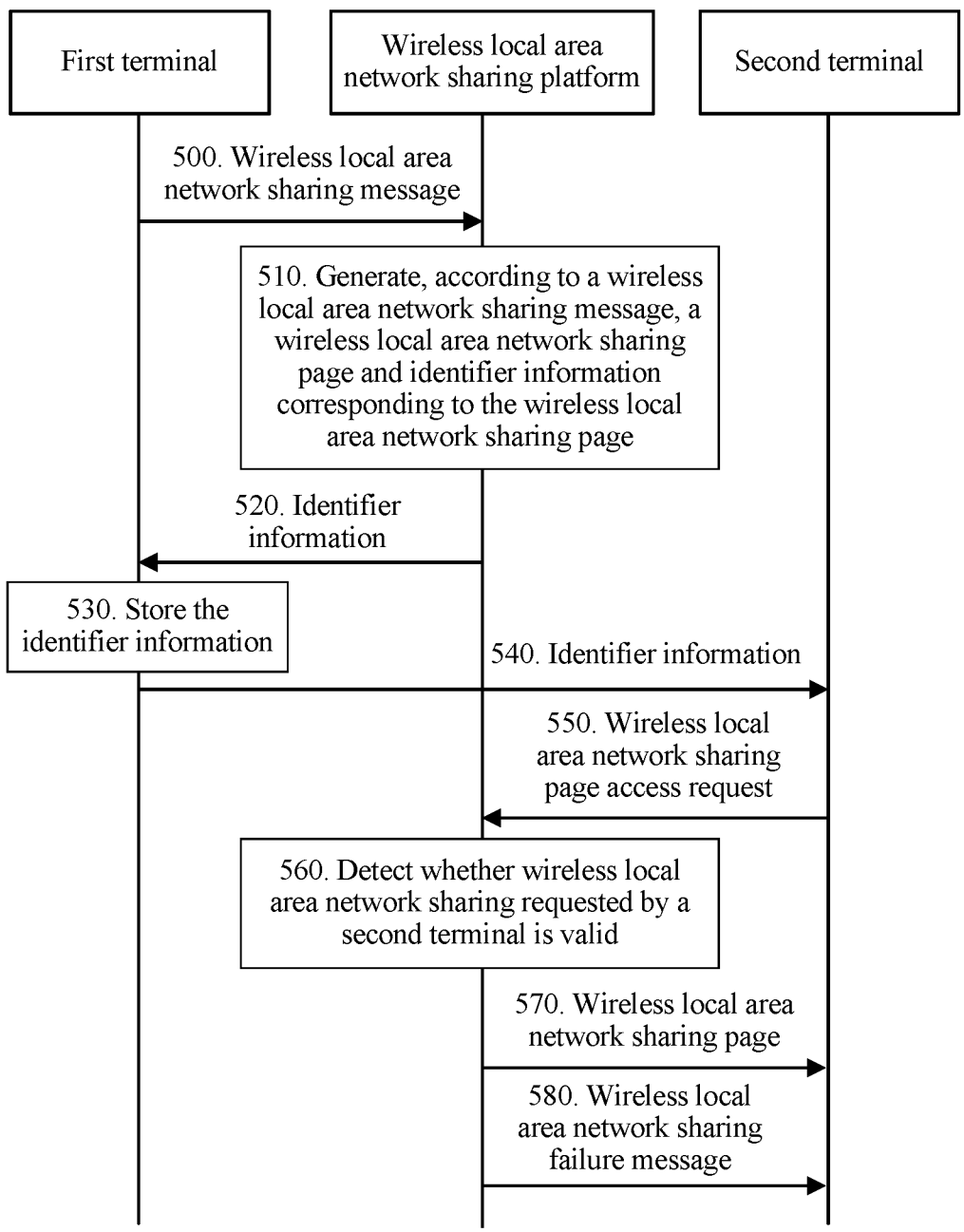
FIG. 5 is a signaling interworking diagram during a process of sharing a wireless local area network according to an embodiment of the present invention.

Based on the foregoing technical solutions, referring to FIG. 5, FIG. 5 is a signaling interworking diagram in a process of sharing a local area network according to an embodiment of the present invention. A process of signaling interworking between communications devices in a process of sharing the wireless local area network in this embodiment of the present invention is as follows:

Step 500: A first terminal sends a wireless local area network sharing message to a wireless local area network sharing platform.

In this embodiment of the present invention, the foregoing wireless local area network sharing message includes at least a wireless local area network SSID, a user name, and a wireless local area network password.

Step 510: The wireless local area network sharing platform generates a wireless local area network sharing page according to the wireless local area network sharing message, and generates identifier information corresponding to the wireless local area network sharing page.

Step 520: The wireless local area network sharing platform sends the identifier information corresponding to the foregoing wireless local area network sharing page to the first terminal.

Step 530: The first terminal locally saves the identifier information corresponding to the foregoing wireless local area network sharing page.

Step 540: A second terminal obtains, from the first terminal, the identifier information corresponding to the foregoing wireless local area network sharing page.

Step 550: The second terminal sends a wireless local area network sharing page access request to the wireless local area network sharing platform.

Step 560: The wireless local area network sharing platform detects whether wireless local area network sharing requested by the foregoing second terminal is valid.

Step 570: When the wireless local area network sharing requested by the second terminal is valid, the wireless local area network sharing platform returns the wireless local area network sharing page to the second terminal.

Step 580: When the wireless local area network sharing requested by the second terminal is invalid, the wireless local area network sharing platform returns a wireless local area network sharing failure message to the second terminal.

Figure 6:
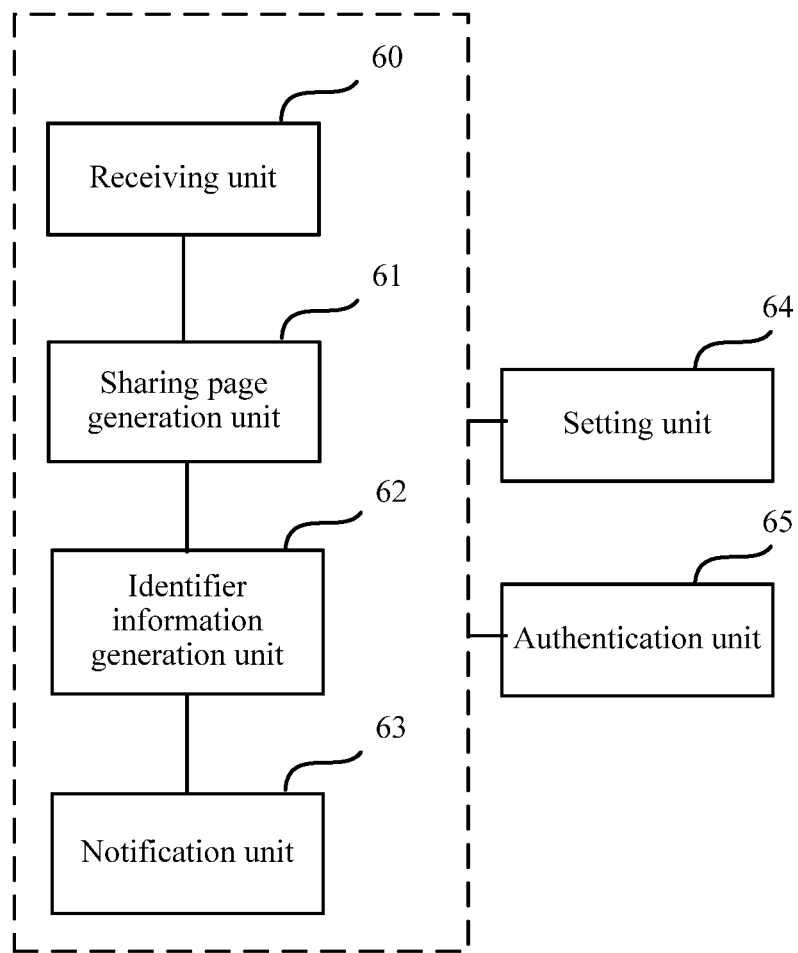
FIG. 6 is a schematic structural diagram of an apparatus for sharing a wireless local area network according to an embodiment of the present invention.

Based on the foregoing technical solutions, referring to FIG. 6, FIG. 6 is a schematic structural diagram of an apparatus for sharing a wireless local area network according to an embodiment of the present invention. In this embodiment of the present invention, the apparatus for sharing the wireless local area network includes a receiving unit 60, a sharing page generation unit 61, an identifier information generation unit 62, and a notification unit 63, where: the receiving unit 60 is configured to receive a wireless local area network sharing message sent by a first terminal, and send the wireless local area network sharing message to the sharing page generation unit 61, where the wireless local area network sharing message carries wireless local area network sharing information; the sharing page generation unit 61 is configured to receive the wireless local area network sharing message sent by the receiving unit 60, generate a wireless local area network sharing page according to the wireless local area network sharing information carried in the wireless local area network sharing message, and send the wireless local area network sharing page to the identifier information generation unit 62, where the wireless local area network sharing page includes the wireless local area network sharing information; the identifier information generation unit 62 is configured to receive the wireless local area network sharing page generated by the sharing page generation unit 61, generate identifier information corresponding to the wireless local area network sharing page, and send the identifier information corresponding to the wireless local area network sharing page to the notification unit 63, where the identifier information is used to uniquely identify the wireless local area network sharing page; and the notification unit 63 is configured to receive the identifier information that is corresponding to the wireless local area network sharing page and that is generated by the identifier information generation unit 62 and notify the identifier information corresponding to the wireless local area network sharing page a second terminal that requests to share the wireless local area network, so that the second terminal accesses the wireless local area network sharing page according to the identifier information and accesses the wireless local area network according to the wireless local area network sharing information included in the wireless local area network sharing page.

Optionally, the identifier information generation unit 62 is specifically configured to: obtain a uniform resource locator corresponding to the wireless local area network sharing page; and use encoded information obtained by encoding the uniform resource locator as the identifier information corresponding to the wireless local area network sharing page.

Optionally, the sharing page generation unit 61 is specifically configured to generate the wireless local area network sharing page according to a wireless local area network service set identifier, and a user name and a password for accessing the wireless local area network, where the wireless local area network service set identifier, and the user name and the password for accessing the wireless local area network are included in the wireless local area network sharing information.

Further, the apparatus further includes a setting unit 64, configured to: if the wireless local area network sharing information includes wireless local area network sharing validity information, after the wireless local area network sharing page is generated, when receiving a wireless local area network sharing invalidity setting message sent by the first terminal, set the wireless local area network sharing validity information included in the wireless local area network sharing page to invalid wireless local area network sharing.

Further, the apparatus includes an authentication unit 65, configured to: when it is detected that the second terminal accesses the wireless local area network sharing page according to the identifier information, obtain the wireless local area network sharing validity information included in the wireless local area network sharing page; and when determining that the obtained wireless local area network sharing validity information is valid wireless local area network sharing, return the wireless local area network sharing page to the second terminal.

Figure 7:
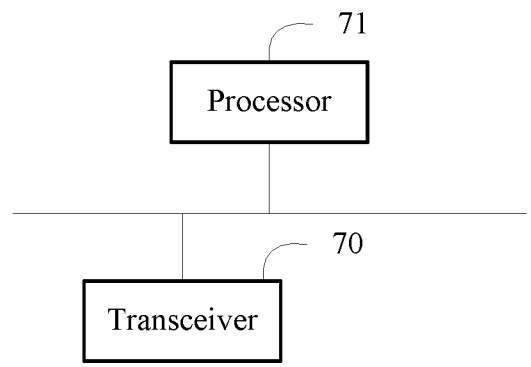
FIG. 7 is a schematic structural diagram of a wireless local area network sharing platform according to an embodiment of the present invention.

Based on the foregoing technical solutions, referring to FIG. 7, FIG. 7 is a schematic structural diagram of a wireless local area network sharing platform according to an embodiment of the present invention. The wireless local area network sharing platform provided in this embodiment of the present invention includes a transceiver 70 and a processor 71, where: the transceiver 70 is configured to receive a wireless local area network sharing message sent by a first terminal, and send the wireless local area network sharing message to the processor 71; the processor 71 is configured to receive the wireless local area network sharing message sent by the transceiver 70 and generate a wireless local area network sharing page according to wireless local area network sharing information carried in the wireless local area network sharing message, where the wireless local area network sharing page includes the wireless local area network sharing information; the processor 71 is further configured to generate identifier information corresponding to the wireless local area network sharing page and send the identifier information corresponding to the wireless local area network sharing page to the transceiver 70, where the identifier information is used to uniquely identify the wireless local area network sharing page; and the transceiver 70 is further configured to notify, to a second terminal that requests to share the wireless local area network, the identifier information that is corresponding to the wireless local area network sharing page and that is sent by the processor 71, so that the second terminal accesses the wireless local area network sharing page according to the identifier information and accesses the wireless local area network according to the wireless local area network sharing information included in the wireless local area network sharing page.

Optionally, the processor 71 is configured to: obtain a uniform resource locator corresponding to the wireless local area network sharing page; and use encoded information obtained by encoding the uniform resource locator as the identifier information corresponding to the wireless local area network sharing page.

Optionally, the processor 71 is configured to generate the wireless local area network sharing page according to a wireless local area network service set identifier, and a user name and a password for accessing the wireless local area network, where the wireless local area network service set identifier, and the user name and the password for accessing the wireless local area network are included in the wireless local area network sharing information.

Optionally, the processor 71 is further configured to generate the wireless local area network sharing page according to wireless local area network sharing validity information included in the wireless local area network sharing information.

Optionally, the transceiver 70 is further configured to receive a wireless local area network sharing invalidity setting message sent by the first terminal, and send the wireless local area network sharing invalidity setting message to the processor 71.

Optionally, the processor 71 is further configured to: after the wireless local area network sharing page is generated, when receiving the wireless local area network sharing invalidity setting message sent by the transceiver, set, according to the wireless local area network sharing invalidity setting message, the wireless local area network sharing validity information included in the wireless local area network sharing page to invalid wireless local area network sharing.

Further, the transceiver 70 is further configured to receive a message that the second terminal requests to access the wireless local area network sharing page according to the identifier information and send the message of requesting to access the wireless local area network sharing page to the processor 71.

Further, the processor 71 is further configured to: receive the message that is used to request to access the wireless local area network sharing page and that is sent by the transceiver 70; when determining, according to the message of requesting to access the wireless local area network sharing page, that the second terminal accesses the wireless local area network sharing page, obtain the wireless local area network sharing validity information included in the wireless local area network sharing page; and when determining that the obtained wireless local area network sharing validity information is valid wireless local area network sharing, instruct the transceiver 70 to return the wireless local area network sharing page to the second terminal.

Optionally, the transceiver 70 is further configured to return the wireless local area network sharing page to the second terminal.

In conclusion, in the embodiments of the present invention, a first terminal sends a wireless local area network sharing message to a wireless local area network sharing platform. The wireless local area network sharing platform generates a wireless local area network sharing page according to wireless local area network sharing information and generates identifier information corresponding to the wireless local area network sharing page. The wireless local area network sharing platform notifies a second terminal that requests to share the foregoing wireless local area network of the identifier information corresponding to the foregoing wireless local area network sharing page, so that the second terminal accesses the wireless local area network sharing page according to the identifier information corresponding to the foregoing wireless local area network sharing page and accesses the foregoing wireless local area network according to the wireless local area network sharing information included in the wireless local area network sharing page. In the technical solutions of the present invention, the second terminal may access the wireless local area network only according to the sharing information included in the wireless local area network sharing page, and a user does not need to learn relevant information such as a user name of the wireless local area network and a password of the wireless local area network, which avoids leakage of the user's information and improves system security.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the exemplary embodiments and all changes and modifications falling within the scope of the present invention.

Obviously, a person skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A method for sharing a wireless local area network, implemented by a wireless local area network sharing platform, the method comprising:
   receiving, by the wireless local area network sharing platform, a wireless local area network sharing message from a first terminal, wherein the first terminal has a wireless local area network connection to the wireless local area network sharing platform, and wherein the wireless local area network sharing message carries wireless local area network sharing information and access authentication information that enables the first terminal to share access to the wireless local area network with a second terminal;
   generating, by the wireless local area network sharing platform, a wireless local area network sharing page according to the wireless local area network sharing information carried in the wireless local area network sharing message, wherein the wireless local area network sharing page comprises the wireless local area network sharing information and the access authentication information;
   generating, by the wireless local area network sharing platform, identifier information corresponding to the wireless local area network sharing page, wherein the identifier information identifies the wireless local area network sharing page; and
   providing, by the wireless local area network sharing platform, the identifier information corresponding to the wireless local area network sharing page to the second terminal, wherein the second terminal does not have a wireless local area network connection to the wireless local area network sharing platform, and wherein the identifier information prompts the second terminal to access the wireless local area network sharing page according to the identifier information and to access the wireless local area network according to the wireless local area network sharing information that is part of the wireless local area network sharing page.

2. The method of claim 1, wherein generating, by the wireless local area network sharing platform, the identifier information corresponding to the wireless local area network sharing page comprises:
   obtaining, by the wireless local area network sharing platform, a uniform resource locator corresponding to the wireless local area network sharing page; and
   using, by the wireless local area network sharing platform, encoded information obtained by encoding the uniform resource locator as the identifier information corresponding to the wireless local area network sharing page.

3. The method of claim 1, wherein the wireless local area network sharing information comprises a wireless local area network service set identifier, a user name, and a password for accessing the wireless local area network.

4. The method of claim 3, wherein the wireless local area network sharing information further comprises wireless local area network sharing validity information, and wherein after the wireless local area network sharing platform generates the wireless local area network sharing page, the method further comprises setting, by the wireless local area network sharing platform, the wireless local area network sharing validity information that is part of the wireless local area network sharing page to invalid wireless local area network sharing upon receipt of a wireless local area network sharing invalidity setting message from the first terminal.

5. The method of claim 4, wherein the identifier information is configured to allow the second terminal to access the wireless local area network sharing page, and wherein the method further comprises:
  obtaining, by the wireless local area network sharing platform, the wireless local area network sharing validity information that is part of the wireless local area network sharing page; and
  returning, by the wireless local area network sharing platform, the wireless local area network sharing page to the second terminal based upon determining that the wireless local area network sharing validity information is valid wireless local area network sharing information.

6. An apparatus for sharing a wireless local area network (WLAN), the apparatus comprising:
  a receiver in communication with the WLAN;
  a transmitter in communication with the WLAN; and
  a processor coupled to the receiver and the transmitter and in communication with the WLAN, wherein the processor is configured to:
    obtain, via the receiver, a first message from a first terminal, wherein the first terminal has a WLAN connection to the apparatus, wherein the apparatus comprises a wireless local area network sharing platform, and wherein the first message comprises sharing information and access authentication information that enables the first terminal to share access to the WLAN with a second terminal;
    generate a WLAN sharing page, wherein the WLAN sharing page comprises information to uniquely identify the WLAN sharing page, the sharing information, and the access authentication information;
    send, via the transmitter, a second message to the first terminal, wherein the second message comprises the WLAN sharing page; and
    receive, via the receiver, a third message from the second terminal, wherein the second terminal does not have a WLAN connection to the apparatus, wherein the third message comprises a request to access the WLAN, and wherein the request comprises at least a portion of user identification information.

7. The apparatus of claim 6, wherein the information to uniquely identify the WLAN sharing page is a uniform resource locator corresponding to the WLAN sharing page.

8. The apparatus of claim 6, wherein the sharing information comprises a service set identifier (SSID), a user name, and a password for accessing the WLAN, and wherein the processor is further configured to generate the WLAN sharing page according to the SSID, the user name, and the password for accessing the WLAN.

9. The apparatus of claim 8, wherein the sharing information further comprises validity information, wherein the WLAN sharing page further comprises validity information, and wherein the processor is further configured to copy the validity information from the sharing information to the validity information of the WLAN sharing page.

10. The apparatus of claim 9, wherein the processor is further configured to:
  obtain the validity information of the WLAN sharing page based on a determination that the second terminal accesses the WLAN sharing page; and
  return the WLAN sharing page to the second terminal based on a determination that the validity information of the WLAN sharing page indicates valid access.

11. A wireless local area network sharing platform, comprising:
  a transceiver in communication with a wireless local area network; and
  a processor coupled to the transceiver, wherein the processor is configured to:
    obtain, via the transceiver, a wireless local area network sharing message, wherein the wireless local area network sharing message is from a first terminal, wherein the first terminal has a wireless local area network connection to the wireless local area network sharing platform, and wherein the wireless local area network sharing message comprises wireless local area network sharing information and access authentication information that enables the first terminal to share access to the wireless local area network with a second terminal;
    generate a wireless local area network sharing page according to the wireless local area network sharing information, wherein the wireless local area network sharing page comprises the wireless local area network sharing information and the access authentication information;
    generate identifier information corresponding to the wireless local area network sharing page, wherein the identifier information uniquely identifies the wireless local area network sharing page; and
    provide, via the transceiver, to the second terminal that desires to share the wireless local area network, the identifier information that corresponds to the wireless local area network sharing page, and wherein the second terminal does not have a wireless local area network connection to the wireless local area network sharing platform.

12. The wireless local area network sharing platform of claim 11, wherein the processor is further configured to:
  obtain a uniform resource locator corresponding to the wireless local area network sharing page; and
  use encoded information obtained by encoding the uniform resource locator as the identifier information corresponding to the wireless local area network sharing page.

13. The wireless local area network sharing platform of claim 11, wherein the processor is further configured to generate the wireless local area network sharing page according to a wireless local area network service set identifier, a user name, and a password for accessing the wireless local area network, and wherein the wireless local area network sharing information comprises the wireless local area network service set identifier, the user name, and the password for accessing the wireless local area network.

14. The wireless local area network sharing platform of claim 13, wherein the processor is further configured to generate the wireless local area network sharing page according to wireless local area network sharing validity information that is part of the wireless local area network sharing information.

15. The wireless local area network sharing platform of claim 14, wherein the transceiver is further configured to:
receive a wireless local area network sharing invalidity setting message from the first terminal; and
send the wireless local area network sharing invalidity setting message to the processor.

16. The wireless local area network sharing platform of claim 15, wherein the wireless local area network sharing page further comprises invalidity information, and wherein the processor is further configured to set wireless local area network sharing page invalidity information according to the wireless local area network sharing invalidity setting message.

17. The wireless local area network sharing platform of claim 16, wherein the transceiver is further configured to:
receive a request message that the second terminal requests to access the wireless local area network sharing page according to the identifier information; and
send the request message to access the wireless local area network sharing page to the processor.

18. The wireless local area network sharing platform of claim 17, wherein the processor is further configured to:
receive the request message to access the wireless local area network sharing page from the transceiver;
obtain the wireless local area network sharing validity information that is part of the wireless local area network sharing page based on determining that the second terminal accesses the wireless local area network sharing page; and
instruct the transceiver to return the wireless local area network sharing page to the second terminal based on determining that the wireless local area network sharing validity information is valid wireless local area network sharing information.

19. The method of claim 1, further comprising:
detecting, by the wireless local area network sharing platform, whether the wireless local area network sharing requested by the second terminal is valid;
returning, by the wireless local area network sharing platform, the wireless local area network sharing page when the wireless local area network sharing requested by the second terminal is valid; and
returning, by the wireless local area network sharing platform, a wireless local area network sharing failure message when the wireless local area network sharing requested by the second terminal is invalid.

20. The apparatus of claim 6, wherein the processor is further configured to:
detect whether WLAN sharing requested by the second terminal is valid;
return the WLAN sharing page when the WLAN sharing requested by the second terminal is valid; and
return a WLAN sharing failure message when the WLAN sharing requested by the second terminal is invalid.

* * * * *